Patented Aug. 16, 1932

1,871,781

UNITED STATES PATENT OFFICE

WALLER CROW AND HIPPOLYT DITTLINGER, OF NEW BRAUNFELS, TEXAS, ASSIGNORS TO DITTLINGER-CROW PROCESS COMPANY, OF NEW BRAUNFELS, TEXAS, A CORPORATION OF TEXAS

GEL PRODUCTION UTILIZATION

No Drawing.     Application filed January 15, 1930.  Serial No. 421,056.

This invention relates to gel or colloid formation of aluminum and alumina reactions.

This invention has utility when incorporated in salt reaction with alkaline earths as barium or magnesium or strontium, or especially calcium hydrate, with say basic aluminum acetate as the reacting agent.

In the carrying out of this invention commercial aluminum acetate, $Al(C_2H_3O_2)_2OH$, or such acetate with two molecules of water is taken in a dry state, as a crystalline substance, and preferably first subdivided to a fineness of 85% passing through one hundred mesh to the inch screen. This dry basic aluminum salt may be worked into a lime after the hydration thereof, say as the lime is going through the finishing mill and accordingly has its temperature below 125° C. This lime hydrate or calcium-magnesium hydrate desirably carries no objectionable excess of moisture and the dispersion of the dry aluminum acetate thereinto is normally affected say in a very minor proportion. As incorporated dry in the mixing it has no more hygroscopic property than the hydrate itself and there is not a tendency for heating or reaction. The aluminum acetate with the calcium hydrate has a quite pronounced exothermic reaction. However, as so minutely dispersed throughout the mass, the formation of putty from the lime, when there is an occasion to use, is not one to bring up the heat of the reaction excessively, say to above 125° C. With the maintenance of this temperature reaction below such range, it is believed there is a maintenance of a physical condition extremely desirable as found by applicants in their operations hereunder.

The reaction between the lime hydrate and the aluminum acetate is believed to produce an aluminum hydrate as distinguished from hydrous aluminum oxid; i. e., a true aluminum hydroxid in gelatinous colloidal suspension, $Al(OH)_3$, as different from hydrous aluminum oxid, $(Al_2O_3)H_2O$, colloquially known as aluminum hydrate. In any event, this hydrate seems to exist here in a gel-pervading condition throughout the hydrate mass for promoting plasticity and holding moisture during the work as well as bringing about a bleach reaction and having attributes toward waterproofing.

In experience of applicants, this reaction involving the change known as double decomposition, and consequently reversible, proceeds in this case to the degree of completion as outlined foregoing, due to disturbed equilibria brought about by the precipitation of resultant calcium salts. Example as follows:

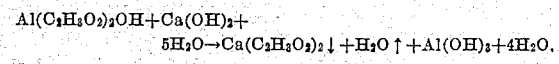
$Al(C_2H_3O_2)_2OH + Ca(OH)_2 +$
$5H_2O \rightarrow Ca(C_2H_3O_2)_2 \downarrow + H_2O \uparrow + Al(OH)_3 + 4H_2O.$ The precipitation of the calcium salts and evaporation of water bring this action to the completion as shown.

The acetate may render some physical assistance in the resultant product, but it is believed the major value is due to the physical condition of the aluminum hydroxid or such hydroxid in a compound with the calcium as a calcium aluminate. Although at the low temperatures found more acceptable, applicants believe the aluminum hydroxid is the real controlling factor in promoting the physical condition for the hydrate rendering such adsorbent to an extent that the water for the putty or other mixture is retained in the mass to a degree promoting fluidity. Accordingly, as so held, it makes the putty workable for a greater length of time and thus permits the application of most thin coats thereof, while this holding of the moisture for the working down in this regard results in the final drying out of the putty coat as one holding its surface even against checking or other cracking, a condition so objectionable for the lime as so used.

In the carrying out of the invention, say for plasticity promotion, as low as .01 of 1% may be used for bleach, if it be of a minor character, but usually the plasticity promotion requires as much as 1/50 of 1% by weight to a larger percentage as may be indicated by the hydrated product from different stones as to the lime hydrate, it being understood the treatment is given only to the limes which are non-plastic or so-called. When the limes are quite resistant, as much as 1% has been used. Even most refractory calcium limes have been treated successfully in producing plasticity hereunder.

While in practice the large field may be as herein disclosed for use with the hydrate as to compounding with the reaction occurring at the time the putty is formed, such may be of an indefinite period after the hydration and mixing. For subsequent ultimate use in the plastic or bleaching of the lime or the hydrate, the mixing may be wet instead of dry. For instance, the so-called red liquor of commerce, that is aluminum acetate, may be used as such, either direct into the hydrate as going to the finishing mill, or this red liquor may be mixed with hydrate of lime to form an initial cream or thin mass and this cream fed into the supply of the hydrate to the finishing mill for the mixture. However, it is preferred, instead of red liquor, to use the mixture resulting from double decomposition of alumina acetate and calcium hydroxid as hereinbefore described.

Where time factor for effecting the reaction is involved, it has been found such may be materially speeded up by having an initial very minute reaction of the aluminum acetate with the hydrate, say as low as .01 of 1% by weight. Thereafter, the reaction quantity may be included. This means that if supplied as a hydrate and aluminum acetate carrier to the major quantity of the hydrate say for ultimate use in putty, the putty may be used directly upon moistening.

This inoculation may occur not only for this low or very minor mixing into the hydrate, but may occur for heavier mixing as in instances where the hydrate is to be used say for waterproofing. This waterproofing may be as a finish or body coat over a masonry wall. It may be even with the lime ingredient or carrier with the mortar or cement and used with the cement in producing the mix of material itself as waterproof. Furthermore, it may be used as a thinned mix as a paint or lake, not only over masonry surfaces but even over such substances as plaster board, fiber board or other composition material of the building board of paper types. In this association, the sustance as so thin may even approximate a condition of a lake and as desired may carry a pigment.

What is claimed and it is desired to secure by Letters Patent is:

1. A composition of matter comprising reaction products of aluminum acetate and hydrate of lime combined in dry form after the complete hydration of the lime.

2. The method of obtaining a colloidal gel dispersion of aluminum acetate in hydrate of lime, comprising hydrating quick lime, and subsequent to hydration subjecting said hydrated lime to sub-division treatment, and during said treatment and with the temperature preferably not to exceed 125° C., incorporating aluminum acetate thereinto for reaction therebetween.

3. The method of contributing to the workability of lime hydrate as a coating material, comprising subjecting hydrated lime to sub-division treatment, and during said treatment reacting thereon with aluminum acetate by working aluminum acetate into the hydrate.

In witness whereof we affix our signatures.

WALLER CROW.
HIPPOLYT DITTLINGER.